United States Patent [19]
Martino

[11] Patent Number: 5,901,818
[45] Date of Patent: May 11, 1999

[54] BRAKE ROTORS WITH HEAT-RESISTANT CERAMIC COATINGS

[76] Inventor: Gerald Martino, New Stanton, Pa.

[21] Appl. No.: 08/721,832

[22] Filed: Sep. 27, 1996

Related U.S. Application Data

[63] Continuation-in-part of application No. 08/441,800, May 16, 1995, abandoned.

[51] Int. Cl.$^6$ ..................................................... F16D 65/10
[52] U.S. Cl. ................................ 188/218 XL; 188/18 A; 188/264 AA; 188/218 A; 192/107 M; 428/472; 428/697; 428/699; 428/701
[58] Field of Search ..................................... 428/472, 701, 428/702, 697, 699; 188/218 XL, 218 A, 264 AA, 18 A; 192/107 M

[56] References Cited

U.S. PATENT DOCUMENTS

| | | | |
|---|---|---|---|
| 4,147,241 | 4/1979 | Preniczny et al. | 188/264 |
| 4,290,510 | 9/1981 | Warren | 188/218 |
| 4,949,818 | 8/1990 | Siede | 188/251 |
| 5,056,630 | 10/1991 | Fujii et al. | 188/251 |
| 5,224,572 | 7/1993 | Smolen, Jr. et al. | 188/218 |
| 5,501,306 | 3/1996 | Martino | 188/218 |
| 5,620,791 | 4/1997 | Dwivedi et al. | 188/251 |
| 5,629,101 | 5/1997 | Watremez | 428/701 |

*Primary Examiner*—Archene Turner
*Attorney, Agent, or Firm*—Daniel A. Sullivan, Jr.

[57] ABSTRACT

Brake rotors each having a brake ring, first and second opposing braking surfaces, and inner and outer peripheral surfaces connecting the braking surfaces. A plurality of apertures may be disposed through the brake ring, extending between the two braking surfaces. A ceramic coating, for providing thermal insulation, is disposed at least on the two braking surfaces. In one preferred embodiment, the brake ring is formed from a composition comprising a substantial proportion of titanium.

20 Claims, 3 Drawing Sheets

BRAKE ROTORS WITH HEAT-RESISTANT CERAMIC COATINGS

CROSS-REFERENCE TO RELATED APPLICATIONS

The present application is a continuation-in-part of U.S. patent application Ser. No. 08/441,800, filed May 16, 1995, for "BRAKE ROTORS WITH HEAT-RESISTANT CERAMIC COATINGS" now abandoned.

BACKGROUND OF THE INVENTION

1. Field of the Invention

The present invention generally relates to brake rotors for motor vehicles, including brake rotors which are suitable for race cars.

Further, the present invention also generally relates to brake rotors for motorcycles, including racing motorcycles. Other motor vehicles to which the present invention can relate, include three-wheeled motorcycles, as well as two-wheeled motorcycles, and three-or four-wheeled ATV vehicles.

2. Background Information

In automobile and motorcycle racing, as well as in other contexts relating to motor vehicles, there can be several critical factors which may influence the performance of the vehicle in question. One important factor is weight, in that an excessively heavy vehicle may not be able to perform effectively. This factor may, for example, have a decisive influence on the speed and fuel economy of the vehicle. Another important factor may be the ability for the vehicle to brake effectively. Particularly, the ability of the vehicle to stop quickly and efficiently, as well as the need to prevent excessive overheating of the brakes, can be tremendously important.

Conventionally, brake rotors have been formed of cast iron or steel, and often do not have a coating for serving as a thermal barrier.

A disadvantage often encountered with such rotors is excessive weight, both in terms of unsprung weight and rotating weight. Such excessive weight may often result in poor fuel economy, as well as an inhibited capability to accelerate. Typically, such a rotor may weigh approximately fifteen pounds, which would typically result in a total weight, for four brake rotors un a four-wheeled vehicle, of about sixty pounds. This has long been considered to be excessive for certain contexts, particularly for the context of race cars.

In conventional rotors, braking problems may also result from a coefficient of friction which may not be as high as desired for certain applications, such as in the context of race cars or racing motorcycles. In the case of conventional cast iron rotors, another disadvantage often encountered is the presence of void or stresses in the casting.

It has been known that the weight of conventional rotors can be reduced by utilizing a lighter material, such as aluminum. If, for example, a lightweight rotor, which may include aluminum, is provided on a vehicle, such as a race car or racing motorcycle, the unsprung weight and rotating weight of the vehicle may be reduced by as much as forty-eight pounds, particularly if each rotor weighs only about three or four pounds.

It has also been known to coat the braking surfaces of a brake rotor with ceramic, in order to provide a higher coefficient of friction than would normally be encountered with a plain cast iron or steel rotor. To date, such ceramics have often included a variety of materials. However, problems relating to durability may be experienced in these contexts. Particularly, in many known applications, it has been found that the ceramic coating may have a tendency to develop cracks with increased use, especially if high braking temperatures are created at the surface of the ceramic coating.

U.S. Pat. No. 5,224,572 discloses the provision of a ceramic coating on each of the two braking surfaces of an aluminum rotor. As disclosed therein, a plurality of circumferentially spaced cooling apertures are arranged between the braking surfaces. The apertures extend radially, between the large central aperture of the rotor and the outer circumference of the rotor, and essentially act to vent away excessive heat. However, it has been found that this aluminum vaned rotor is not necessarily provided with as significant a degree of thermal protection as may often be desired in certain contexts, such as in the context of a racing car or racing motorcycle. Further, it has been also found that this aluminum vaned rotor does not necessarily provide as great a reduction in either unsprung weight or rotating weight as may otherwise be desired in certain contexts, such as in the context of a racing car or a racing motorcycle.

In the context of motorcycles, including racing motorcycles, it would appear that weight reduction can be a particularly important consideration. Particularly, for a given rotor, it would appear that a reduction in rotor weight would be proportionally more significant in a motorcycle than in an automobile, owing to what would appear to be a significantly proportionally reduced weight of a motorcycle in comparison with an automobile. Thus, it would appear that a motorcycle, such as a racing motorcycle, having rotors with significantly reduced weight in comparison with conventional rotors, could be at a tremendous advantage with regard to performance and fuel efficiency, especially in the context of racing.

To date, another type of known rotor in wide use has been the carbon-fiber rotor. When initially manufactured, carbon-fiber rotors appeared to possess significant advantages over prior known rotors, especially in the context of motorcycles and racing motorcycles.

However, it is now believed that carbon-fiber rotors have fallen out of favor among, and have even been prohibited by, certain racing organizations. Further, carbon-fiber rotors can tend to be expensive to manufacture, and may not necessarily provide the desired advantages of heat resistance.

This inventor tried bare rotors made of a titanium composition. However, bare rotors having a titanium composition did not always tend to provide desired advantages of heat resistance or reflection. Further, at high speeds and high brake temperatures, bare titanium rotors, as well as other bare rotors, may "gauld" or "gall". Such "gaulding" or "galling" can essentially be thought of as undesirable rubbing or chaffing on the rotor surface, with the result of wearing away part of the rotor surface, at least partly possibly accounted for by the swelling of the rotor surface at high temperatures.

Therefore, it appears that a need has arisen for lightweight rotors capable of enhancing the performance and fuel efficiency of motor vehicles, including motorcycles, and which do not possess the disadvantages either of carbon-fiber rotors or of other rotors, such as bare titanium rotors.

OBJECT OF THE INVENTION

It is an object of the present invention to provide a brake rotor which overcomes the disadvantages discussed above in relation to known types of brake rotors. More specifically, the invention seeks to provide optimally functionable brake rotors that have the characteristics of reduced weight and increased thermal protection, and which can be produced at reasonable cost.

SUMMARY OF THE INVENTION

The above objects, among others, are achieved by the present invention in the provision of a ceramic coating which includes nickel, in accordance with parameters discussed more fully herebelow. It has been found, surprisingly, that such a ceramic coating, in the context of a brake rotor, provides a highly cost-effective composition for providing thermal protection to a greater degree than previously encountered with other brake rotors.

Additionally, according to at least one preferred embodiment of the present invention, there are preferably a series of apertures, passages or holes drilled between the braking surfaces of the rotor. This characteristic has also been found, surprisingly, to increase ventilation and thereby further contribute to the dissipation of high temperatures at the surface of the brake rotor. Further, it has been found that the ceramic coating according to the present invention is surprisingly durable, even around the apertures, where it might otherwise be expected that significant damage to the coating may occur.

In accordance with at least one preferred embodiment of the present invention, the brake rotor is manufactured from high carbon, stress-relieved steel. This appears to provide the advantages of avoiding the types of voids or stresses which may be present in a cast iron product. Additionally, the use of plate steel appears to allow for less expansion and contraction and appears to allow for a significantly high bond strength and tensile strength. Compared with a conventional rotor, anywhere from about five to about eight pounds of rotating weight may be saved. Further, a rotor manufactured in accordance with at least one preferred embodiment of the present invention can provide a reduction in weight of about twelve ounces, in comparison with a vaned aluminum rotor.

Generally, in view of the features disclosed by the present invention, it is possible to provide a brake rotor which has reduced weight and increased thermal insulation in comparison with known brake rotors. It is essentially possible, by virtue of the present invention, to also provide a brake rotor which has a reduced thickness when compared with other known brake rotors.

In accordance with another preferred embodiment of the present invention, the brake rotor is manufactured from a composition that includes a significant proportion of titanium. Titanium combines light weight with high temperature strength. This appears to provide significant advantages in weight reduction in comparison with known conventional rotors, including carbon-fiber rotors and even steel rotors. In comparison with steel, it is believed that a weight reduction of between about 50% and 60% can be achieved. In the context of the motorcycle, such as a racing motorcycle, the weight reduction can be decisively significant, in that the performance and fuel efficiency of the motorcycle can be significantly enhanced, to a proportionally higher degree than in the case of four-wheeled motor vehicles. Significant advantages of thermal protection can also be obtained if a ceramic coating such as that described heretofore, at the beginning of this "Summary of the Invention" section, is utilized in conjunction with the titanium rotor. Particularly, it has been found, surprisingly, that a titanium rotor coated with a ceramic provides significant advantages of heat resistance and reflection in comparison with the known rotors.

As will be apparent from the disclosure which follows, the present invention encompasses both single-plane rotors and vaned rotors. Vaned rotors have parallel planes separated by vanes.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention will be more readily appreciated with reference to the accompanying drawings, in which.

DESCRIPTION OF THE PREFERRED EMBODIMENTS

Figure 1:
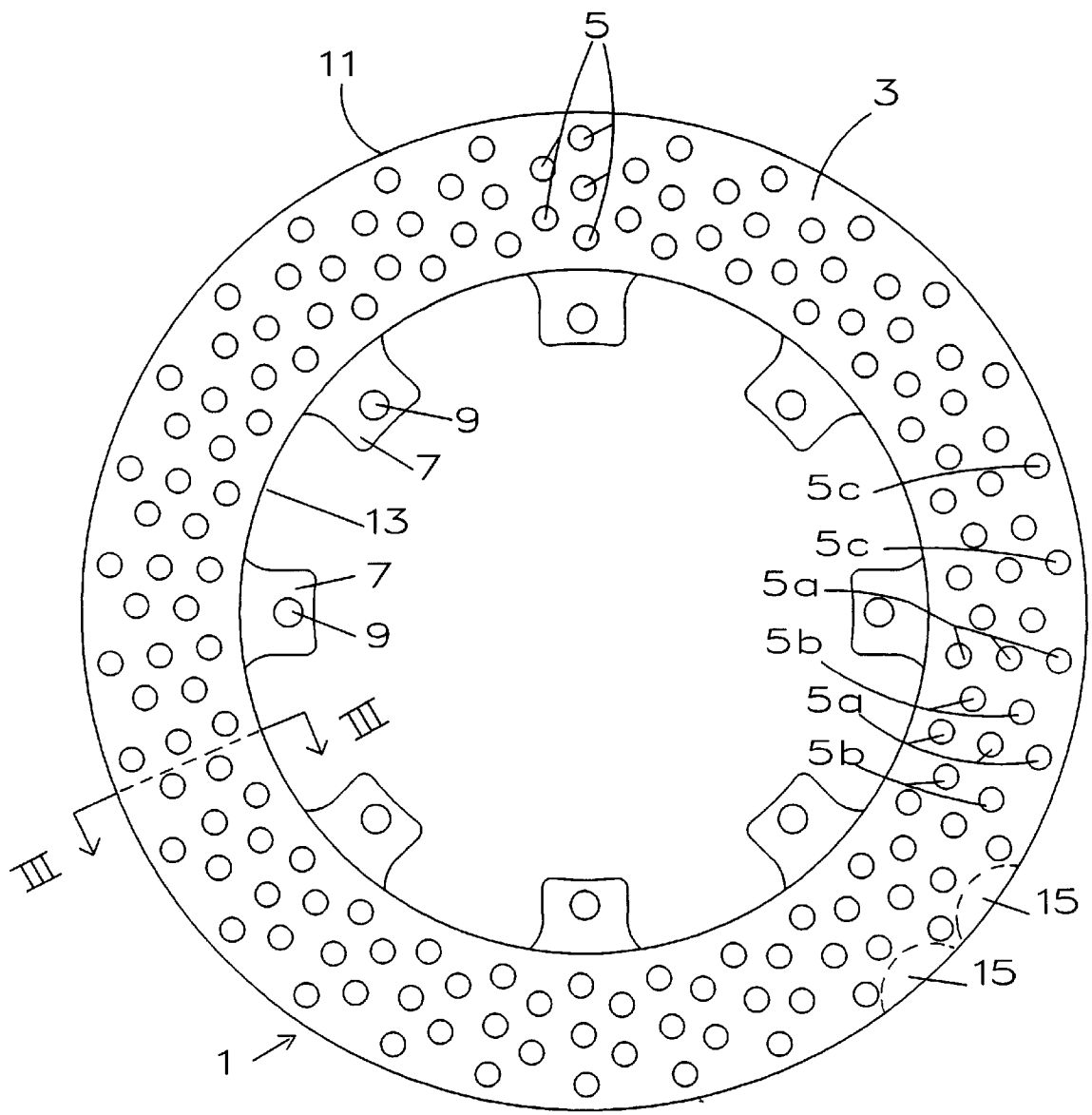
FIG. 1 shows a plan view of a brake rotor according to the present invention.

In accordance with a preferred embodiment of the present invention, as illustrated in FIG. 1, brake rotor 1, preferably ring-like in shape, preferably includes two opposite braking surfaces 3, one of which is shown in FIG. 1. The braking surfaces are preferably oriented parallel to one another.

Preferably disposed through the brake rotor 1 are a plurality of holes, passages or apertures 5, which preferably extend from one braking surface 3 to the opposite braking surface 3. The holes, passages or apertures 5 preferably extend through the entire thickness of the brake rotor 1, preferably in a direction perpendicular to the braking surfaces 3.

As shown in FIG. 1, in accordance with a preferred embodiment of the present invention, the holes, passages or apertures 5 are preferably distributed about substantially the entire circumferential extent of the brake rotor 1. Preferably, holes, passages or apertures 5 are distributed in a substantially uniform array about the circumferences of brake rotor 1. Preferably, the holes, passages or apertures 5 may be distributed in such a way as to provide considerably reduced weight in comparison with a similar rotor having no holes, while still allowing optimal functionability of the rotor 1. This optimal functionability would include, for example, the ability of the brake rotor 1 to provide sufficient braking via the application of friction pads against the braking surfaces 3.

In the context of race cars or racing motorcycles, it has been found that an array of holes, passages or apertures 5 similar to that illustrated in FIG. 1, can help provide these optimal characteristics. Preferably, with regard to each braking surface, in accordance with at least one embodiment of the present invention, the removed surface area represented by the holes or apertures 5 may represent about 60 percent of the total surface area of the braking surface in question. Within the scope of the present invention, however, this figure could be between about 55 percent and about 65 percent of the total surface area of the braking surface in question. Alternatively, within the scope of the present invention, this figure could be between 45 percent and about 65 percent of the total surface area of the braking surface in question. Additionally, this figure may also be one of the following: 40% or less, 70% or 75% or more, or any value intermediate to any of the values mentioned heretofore.

The rotor 1 preferably has an outer peripheral surface 11 and an inner peripheral surface 13, both of which surfaces 11, 13 preferably connect both braking surfaces 3 with each other.

A plurality of lugs 7, preferably eight in number, are preferably arranged uniformly about the inner peripheral surface 13 of the rotor 1 and extend radially inwardly. Each lug 7 is preferably appropriately provided with a hole 9 for connection with a hub member.

Figure 2:
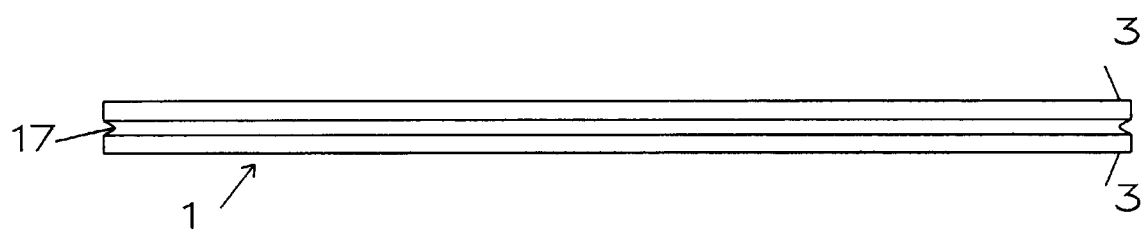
FIG. 2 shows an elevational view of the brake rotor illustrated in FIG. 1.

FIG. 2 is an elevational view of the brake rotor illustrated in FIG. 1. Preferably, the outer peripheral surface 11 (see FIG. 1) of the rotor 1 is indented about substantially its entire circumference with a groove 17.

The disclosure now briefly turns to an illustration example of a brake rotor according to the present invention, with physical dimensions. Reference can be made to both FIG. 1 and FIG. 2.

As an illustrative example, rotor 1 may have an outer diameter, at outer peripheral surface 11, of about 11.75" and an inner diameter, at inner peripheral surface 13, of about 8.75". Accordingly, the radial dimension of the ring constituted by the rotor 1, as measured between outer peripheral surface 11 and inner peripheral surface 13, may be about 1.5".

There may be sixty sets of apertures 5 distributed about the rotor 1, each set of apertures having two or three apertures, wherein all of the apertures within each set may be aligned along a common radius of the rotor 1. There may be two alternating patterns 5a, 5b of apertures among the sixty sets of apertures as follows:

thirty sets 5a of the apertures may be constituted by three apertures each, wherein the two apertures closer to the center of the rotor may have a diameter of about 3/8" and the aperture furthest away from the center of the rotor, indicated at 5c, may have a diameter of about 5/16", and wherein the apertures may be substantially evenly spaced; and thirty sets 5b of the apertures may be constituted by two apertures each, wherein each aperture has a diameter of about 3/8".

In accordance with at least one preferred embodiment of the present invention, between outer apertures 5c of respective sets 5a, generally along the outer circumference of rotor 1, there may preferably be what may be considered bights of material 15, indicated schematically by dotted lines in FIG. 1, projecting into the general pattern of apertures 5. In other words, the positioning of outer apertures 5c relative to the sets of apertures 5b may preferably be such that a noticeable amount of plate material exists between the radially outermost aperture of each set 5b and the outer peripheral surface 11. As an example, the distance between the radically outermost point on the radially outermost aperture 5 of a set of apertures 5b and the outer peripheral surface 11 of rotor 1 may be about 11/32", whereas the distance between the radially outermost point of an aperture 5c and the outer peripheral surface 11 of rotor 1 may be about 1/8". Thus, a bight, or encroachment, of material 15, towards the center of the rotor 1, may be seen repeatedly about the outer circumference of the rotor 1. Conceivably, the presence of these bights 15 may, in the presence of apertures 5, aid in braking, by creating a somewhat expanded locus of contact between a friction pad and a braking surface 3.

The brake rotor 1 may have an overall thickness of about 1/4". The axial dimension of the circumferential groove 17, defined parallel to the thickness of the rotor 1 and perpendicular to the braking surfaces 3, may be about 3/32".

Each lug 7 may have a radial dimension, defined along a radius of rotor 1, of about 3/4", and may have a transverse dimension, defined generally transverse to the radial dimension, of about 15/16". Each hole 9 may have a diameter of about 11/32.

Each hole 5 is preferably bevelled at each braking surface 3. Additionally, each hole 9 is preferably bevelled at each opposing surface of the corresponding lug 7.

It has been found that a steel rotor having dimensions and characteristics as set forth hereinabove may have a weight of about 3 lbs., 9 or 10 ounces; that is, 57 or 58 ounces.

It will be understood that the foregoing merely represents an example for the purposes of illustration, and that brake rotors having different dimensions, and different arrangements of apertures, are conceivable within the scope of the present invention. For example, it is conceivable to provide apertures not in the form of circular holes, but in the form of circumferentially oriented slits or perforations.

It will also be understood that, in accordance with at least one preferred embodiment of the present invention, the dimensions set forth heretofore may conceivably vary by a factor of about plus or minus one-third of the cited dimension, especially in the case of smaller dimensions. Other dimensions and proportions, relating to the illustrative example set forth heretofore, may be divined from FIG. 1, as FIG. 1 may be considered to be essentially drawn to scale with relation to the illustrative example set forth heretofore.

Figure 3:
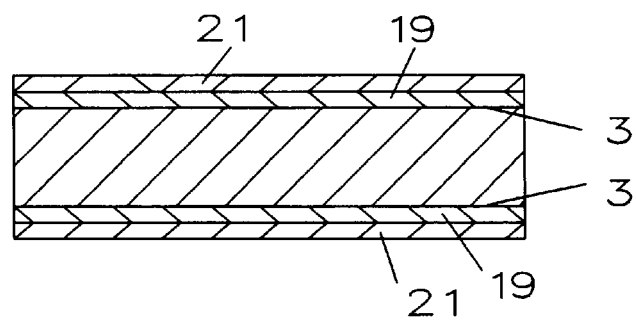
FIG. 3 is a cross-section, taken along III—III of FIG. 1, which schematically illustrates different layers associated with a brake rotor according to the present invention.

FIG. 3 provides a detailed, and essentially highly exaggerated, view of a cross-section of rotor 1, the cross-section being taken along line III—III of FIG. 1. As illustrated schematically in FIG. 3, each braking surface 3 preferably has disposed thereupon a bonding layer 19 and a thermal barrier layer 21. The particular composition of these layers will be discussed more fully herebelow, as well as methods for applying the same to the braking surfaces 3. Generally, however, bonding layer 19 may preferably include a thin layer of nickel, whilst the thermal barrier layer 21 may preferably include, in accordance with at least one preferred embodiment of the present invention, a mixture of nickel and zirconium oxide. Preferably, bonding layer 19 and thermal barrier layer 21 will each have been applied to the braking surfaces 3 by plasma spraying techniques which are well known to those of ordinary skill in the art.

Figure 4:
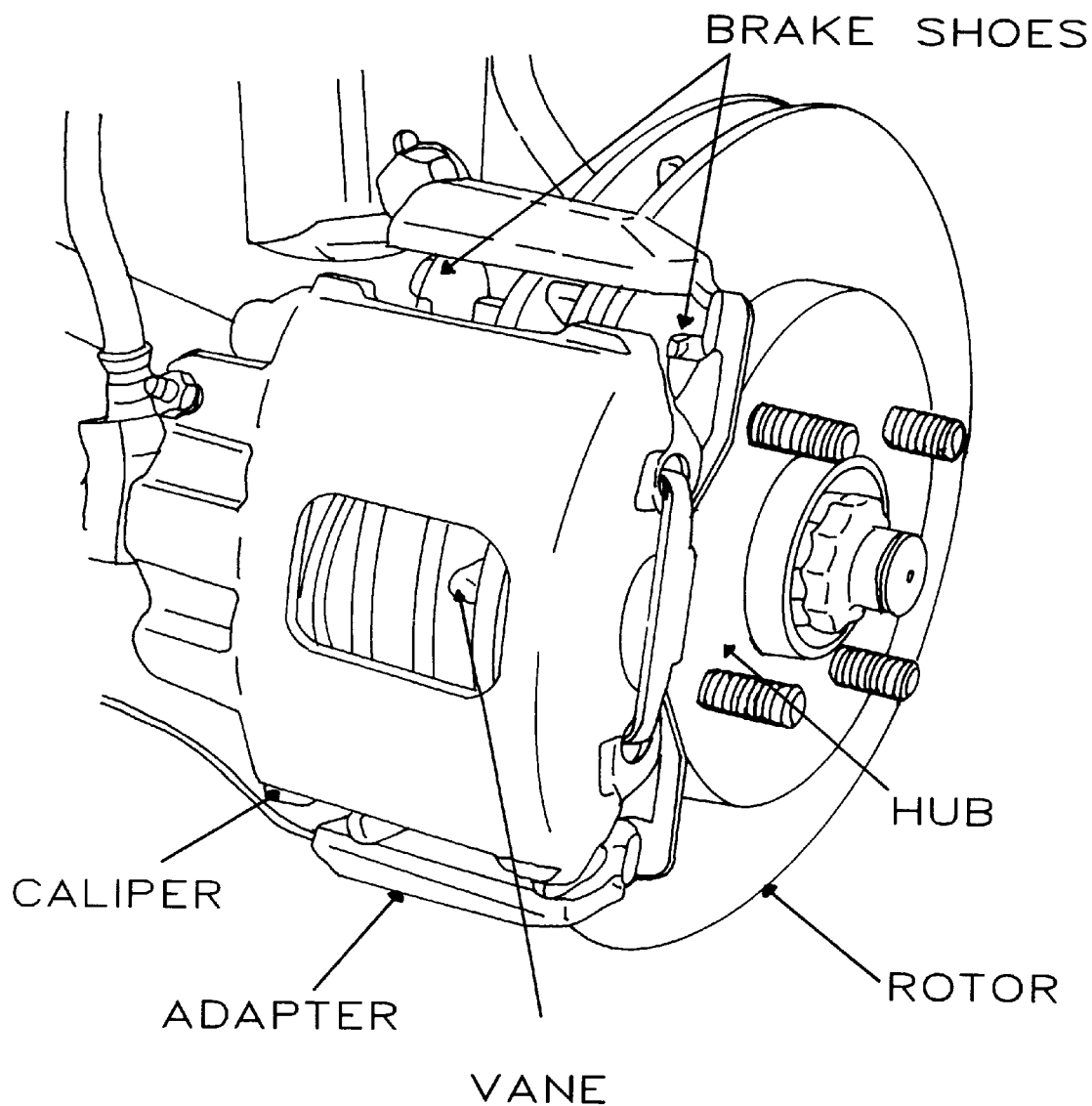
FIG. 4 illustrates a typical brake assembly employing a brake rotor according to the present invention.

FIG. 4 illustrates a typical brake assembly in which a brake rotor according to the present invention may be employed. Various components of the brake assembly are indicated by name. It will be understood that the "brake shoes" may essentially be considered as including friction pads. Unlike the single-plane rotor of FIGS. 1 to 3, the rotor of FIG. 4 is a vaned rotor composed of two planes, made, for instance, of titanium or titanium alloy and each having an outwardly facing braking surface provided with a ceramic coating. The two planes are separated by inwardly situated vanes. The rotors of the invention may, or may not, have holes 5 in the braking surfaces, and, to illustrate this variation, the vaned rotor illustrated in FIG. 4 does not have holes 5. Vaned rotors may be manufactured using jigs to hold the vanes in place relative to the planes, followed by TIG welding of the vanes to the interior surfaces of the planes. Alternatively, vaned rotors may cast as one unit, using casting processes, such as investment casting.

In comparative tests, braking pressure was used to bring rotor temperature to 1000 degrees F., as measured with a probe-equipped pyrometer. It is found that hub temperature is 50 to 100 degrees F. cooler for a titanium rotor of the invention, as compared to a steel rotor. Thus, temperature of an aluminum hub will be around 250 degrees F. for the steel rotor, as compared with about 150 to 175 degrees F. for the titanium rotor. It is believed that this is an effect of the lower thermal conductivity of the titanium rotor, as compared to steel, so that the temperature increase in the ceramic coating is not conducted as easily to the hub.

The disclosure now turns to a discussion of a preferred method for forming a brake rotor in accordance with the present invention. For this purpose, reference may be made to FIGS. 1–3.

Fundamentally, brake rotor 1 may preferably be formed from a high-carbon stress relieved steel. The rotor may then be provided with apertures 5, preferably in an array characterized in a similar vein as the array described heretofore with relation to the illustrative example. Additionally, the rotor 1 may preferably be provided with the aforementioned circumferential groove 17 by an appropriate method. Such a method for providing a circumferential groove is generally well-known to those of ordinary skill in the art and will not be described in further detail here.

In accordance with another preferred embodiment of the present invention, brake rotor 1 may preferably be formed from a composition that includes a significant proportion of titanium. As with a steel rotor, the rotor may then be provided with apertures 5, preferably in an array characterized in a similar vein as the array described heretofore with relation to the illustrative example. Additionally, the rotor may preferably be provided with the aforementioned circumferential groove 17 by an appropriate method. Such a method for providing a circumferential groove is generally well-known to those of ordinary skill in the art and will not be described in further detail here.

Within the scope of the present invention, numerous compositions, having a significant proportion of titanium, are conceivable for use in a brake rotor. The following is an example of one composition that may be used to form a brake rotor 1 according to the present invention, showing each constituent element and its percentage by weight in the composition:

| Element | Weight % |
|---|---|
| Aluminum | 1.5 |
| Iron | 4.5 |
| Molybdenum | 6.8 |
| Oxygen | 0.15 |
| Carbon | 0.05 |
| Nitrogen | less than 0.05 |
| Hydrogen | less than 0.015 |
| Residual elements, each | less than 0.1 |
| Residual elements, total | less than 0.4 |
| Titanium | balance |

The above composition is listed, and discussed, in the Preliminary Data Sheet published by Timet of 1999 Broadway, Denver, Colo. 80280, Jun. 1, 1993, entitled "TIMETAL LCB (Ti-1.5A-4.5Fe-6.8Mo) Low Cost High Strength Alloy". This publication is incorporated herein by reference as if set forth in its entirety herein. The above composition is believed to bear the label "62S".

Thus, in the composition listed above, the percentage of titanium is in the neighborhood of 86 or 87 percent.

It has been found that a composition, having the proportions listed above, produces highly satisfactory results within the context of the present invention.

Preferably, then, a titanium-based rotor according to the present invention will have a highly significant percentage of titanium therein, such as about 86% or 87% or more. In at least one preferred embodiment of the present invention, this proportion could be considered as being about 85 percent or more. Conceivably, then, it is possible, within the scope of the present invention, to provide a titanium rotor having very significantly high percentages of titanium, such as about 86 percent, about 88 percent, about 90 percent, about 92 percent, about 94 percent, about 96 percent, about 98 percent, and even 99 percent or more. It is conceivable, within the scope of the present invention, to form the brake rotor 1 out of pure titanium, that is 100 percent titanium. Appropriately, the presence of titanium in the composition may be at a proportional value intermediate to those listed immediately here and above.

Titanium which is essentially unalloyed has nevertheless the strengh to serve as a material of construction for brake rotors. An example of essentially unalloyed titanium is specified under ASTM B-265-94 and ASME SB-265 A90 Grade 2, material annealed by heating to 1400 F., with subsequent air cool, having the following composition and mechanical properties:

| Element | Weight % | |
|---|---|---|
| Iron | 0.10 | |
| Oxygen | 0.14 | |
| Nitrogen | 0.009 | |
| Carbon | 0.008 | |
| Hydrogen | 0.002 | |
| Residual elements, each | less than | 0.10 |
| Residual elements, total | less than | 0.40 |
| | | remainder |
| Tensile Data | Longitudinal | Transverse |
| Tensile PSI | 69200 | 71300 |
| Yield 02.% offset | 46100 | 48100 |
| Elong % in 2" | 56.0 | 51.0 |

If material of this same composition is TIG welded as vanes between two annular planes of it cut from plate material, in order to form a vaned rotor, the finished product is given a normalizing, stress-relief heat treatment of 1200 degrees F. for one hour, followed by air cool, before grit-blasting preparatory to the ceramic coating process.

Alternatively, it is conceivable, within the scope of the present invention, that amounts of titanium lower than about 80 percent could be utilized. For example, it is conceivable to utilize about 78 percent, about 76 percent, about 74 percent, about 72 percent, and about 70 percent titanium within the scope of the present invention, or any values intermediate to these values.

It has been found that another effective titanium composition for use in the context of the present invention is the "6-4" titanium composition that also originates from Timet of Denver, Colo.

At the close of the instant specification, several U.S. patents are listed as disclosing titanium compositions, and are incorporated herein by reference. As noted, these U.S. patents disclose titanium compositions that may be utilized in accordance with the embodiments of the present invention. Generally, the titanium compositions disclosed by these U.S. patents have titanium proportions of about 88% or 90% or more, but the present invention should in no way be construed as being limited to such compositions or the composition specifically listed hereinabove.

Unless otherwise noted, the remainder of the present disclosure is equally applicable to steel rotors and rotors formed from a titanium composition/alloy, as well as rotors formed from other metals.

Preferably, the rotor 1 is grit- or sand-blasted in preparation for receipt of the aforementioned coatings 19, 21 on the respective braking surfaces 3. Suitable sand-blasting techniques are generally well-known to those of ordinary skill in the art and will not be described in further detail herein. Subsequent to sand-blasting, the braking surfaces 3 of the rotor are preferably bond-coated with nickel to about 0.005 inches. The nickel is preferably applied by a plasma-spraying technique. The temperature maintained during the plasma spraying process may preferably be between about 10,000 F. and about 12,000 F.

Although the preferred thickness of the bond coating has been cited hereinabove as 0.005 inches, and has been found to produce essentially optimal results, it will be appreciated that satisfactory results can also be achieved with thicknesses slightly higher or lower than 0.005 inches. Particularly, it is conceivable, within the scope of the present invention, to provide a thickness of about 0.003 inches, about 0.0035 inches, about 0.004 inches, about 0.0045 inches, about 0.0055 inches, about 0.006 inches, about 0.0065 inches or about 0.007 inches. Values lower than 0.003 inches or higher than 0.007 inches may also produce satisfactory results.

The outer ceramic coating 21 is preferably also provided by a plasma-spraying technique, preferably to a thickness of between about 0.01 inches and about 0.03 inches, and more preferably in the range 0.005 to 0.015 inches. Preferably, the outer ceramic coating essentially preferably includes primarily zirconium oxide, but preferably includes between about 10 percent and about 20 percent nickel by volume. This grading of the composition of one layer of the coating into that of the other decreases the abruptness of changes in coefficient of thermal expansion from one layer to the next. Within the scope of at least one embodiment of the present invention, however, the presence of nickel could be essentially considered to be between about 10 percent and about 25 percent. Alternatively, within the scope of at least one preferred embodiment of the present invention, this figure could be essentially considered to be between about 5 percent and about 25 percent.

It will be understood, then, that, in accordance with at least one preferred embodiment of the present invention, the content of nickel in the outer ceramic coating may preferably be about 10%, about 11%, about 12%, about 13%, about 14%, about 15%, about 16%, about 17%, about 18%, about 19% or about 20%. Generally, a ceramic coating containing zirconium oxide and about 15 to 20% nickel by volume generally provides highly favorable results. Values outside the range of about 10% to about 20% may also produce satisfactory results, such as: about 5%, about 6%, about 7%, about 8%, about 9%, about 21%, about 22%, about 23%, about 24%, about 25%, about 26%, about 27%, about 28% or about 29%, or about 30%.

Additionally, it will be understood that, in accordance with at least one preferred embodiment of the present invention, the thickness of the ceramic coating may preferably be about 0.01 inches, about 0.015 inches, about 0.02 inches, about 0.025 inches or about 0.03 inches. Values outside the range of about 0.01 inches to about 0.03 inches may also produce satisfactory results, such as: about 0.005 inches, about 0.006 inches, about 0.007 inches, about 0.008 inches, about 0.009 inches, about 0.031 inches, about 0.032 inches, about 0.033 inches, about 0.034 inches and about 0.035 inches.

Conceivably, in accordance with at least one preferred embodiment of the present invention, the nickel employed could originate from the same source as the nickel utilized for the bond-coating process, thus economizing on the materials used.

Conceivably, in accordance with at least one alternative preferred embodiment of the present invention, the bond coating could be constituted by nickel chromium or nickel alumide. Preferably, the bond coating 19 possesses expansion and contraction properties intermediate those of the metal ring of the brake rotor and of the ceramic coating.

Conceivably, in accordance with at least one alternative preferred embodiment of the present invention, the ceramic coating, in addition to the nickel, could be constituted by stabilized zirconium oxide or other zirconium-based ceramics. Such zirconium-based ceramics include, for example, zirconia and zirconium oxide.

It has been found that, generally, a ceramic coating as described hereinabove can essentially reflect heat in such a way that the coating retains its original color, that is the color of the coating prior to a braking operation, at braking temperatures of up to about 1200 F.

Coatings composed of more than two layers may, of course, be used, for instance for the purpose of making transitions between different coefficients of thermal expansion less abrupt, or for the purpose of introducing various kinds of materials offering special advantages.

Preferably, in accordance with at least one preferred embodiment of the present invention, each of the lugs 7 is uncoated, that is, does not have disposed thereupon, either bonding layer 19 or ceramic coating 21.

Preferably, in accordance with at least one preferred embodiment of the present invention, the interior surfaces of the holes 5 will have both the bond coating and ceramic coating disposed thereupon, for thermal protection.

In at least one preferred embodiment of the present invention, there may preferably be, in the vehicle in which the rotor is mounted, one or more air ducts leading to the vicinity of the rotor in question. Such air ducts, which may conceivably include one or more conduits for introducing fresh air generally from the front of the vehicle to the vicinity of the rotor in question, are generally well-known to those of ordinary skill in the art and, as such, will not be described in more detail herein.

Whereas the description of air ducts set forth immediately hereinabove can be considered as being applicable to four-wheeled motor vehicles, such as automobiles, it should be understood that similar provisions could be made for motorcycles. Ventilation arrangements for motorcycles, which may conceivably be arranged so as to introduce fresh air to the vicinity of the rotor in question, are generally well-known to those of ordinary skill in the art and, as such, will not be described in more detail herein.

To recapitulate, in accordance with at least one preferred embodiment of the present invention, a brake rotor according to the present invention may preferably encompass the following characteristics:

the rotor can preferably be made of a high carbon stress relieved steel or titanium;

the rotor may preferably have essentially any diameter from about seven inches to about fifteen inches;

the rotor is preferably made so as to have a thickness of between about 0.100" and 0.750", and is preferably drilled with variously sized holes to lighten the rotor;

the holes are preferably drilled perpendicularly with respect to the rotor, so as to essentially resemble "Swiss cheese";

the rotor is preferably sand blasted and bond-coated with a high temperature nickel plasma spray, to a thickness of about 0.005";

on top of the bond coat, a zirconium oxide plasma spray, preferably having characteristics as described heretofore, is preferably sprayed on the rotor, to a thickness of preferably between about 0.010" and 0.030", as a thermal barrier;

Additionally, in accordance with at least one preferred embodiment of the present invention, it will be appreciated that a brake rotor according to the present invention can essentially exhibit the following advantages:

plate steel, if utilized, allows for less expansion and contraction and allows for very high bond strength, as well as very high tensile strength;

compositions having a significant proportion of titanium, if utilized, appear to provide advantages of significant weight reduction and significantly improved heat reflection or radiation;

the thermal characteristics of the ceramics essentially allows the rotors to be drilled and ground thinner, allowing the use of a much lighter rotor in comparison to a vaned rotor or a conventional single-plane rotor, including an aluminum rotor;

compared to a conventional rotor, a steel rotor can save anywhere from about five to about eight pounds of rotating weight;

a rotor, according to at least one preferred embodiment of the present invention, can out-stop a conventional rotor because of the ceramics having a higher coefficient of friction than a plain cast iron or steel rotor;

a rotor, according to at least one preferred embodiment of the present invention, having steel as described heretofore, can weigh about twelve ounces less than a vaned aluminum rotor of comparable size;

a steel rotor, according to at least one preferred embodiment of the present invention, can be considerably stronger than a conventional cast-iron rotor because of being made of rolled plate, not a cast product, wherein a cast product could have voids or stresses built into the casting;

a rotor, according to at least one preferred embodiment of the present invention, could have many uses, including the provision of an average automobile or motorcycle with less rotating weight, which could, in turn, result in better acceleration and fuel economy; and a rotor, according to at least one preferred embodiment of the present invention, could be suited for a very wide variety of racing vehicles or other types of performance vehicles, from "go-karts", to "Indy" cars, to drag racers, to "monster trucks", and conceivably could be suited for "funny cars".

Thus, although a brake rotor according to the present invention may essentially be considered to be suitable for NASCAR race cars, it may be suitable for several other types of racing or performance vehicles, as well.

Further, a rotor, according to at least one preferred embodiment of the present invention, could be suited for a very wide variety of racing motorcycles or other types of performance motorcycles, including two-wheeled racing motorcycles, three- or four-wheeled ATV vehicles, and other types of motorcycles.

Further illustrative of the invention is the following

Example

The above A-90 Grade 2 essentially pure titanium, in the form of a brake rotor, was provided with a ceramic coating on its previously grit-blasted braking surfaces, using powders propelled through a Metco plasma 3M spray system. The ceramic coating was a graded coating created by the application of three layers, in the sequence of first a bond coat, next an intermediate coat, and finally a top coat. The bond coat of 0.004 to 0.006 inches thickness was 4½ wt.-% aluminum, 95½ wt.-% nickel, Type 480-S material of Sultzer Metco, Westbury, N.Y. The intermediate coat of 0.1 to 0.2 inches, preferably 0.008 to 0.012 inches, thickness was 70 parts by weight yttria-stabilized zirconium oxide, Type 205 material of Sultzer Metco, Westbury, N.Y., 30 parts by weight of the Type 480-S material, and 10 parts by weight tungsten carbide. Placing some bond coat material and some top coat material in the intermediate coat assists in the transition from the coefficient of thermal expansion of the bond coat to that of the top coat. The top coat of 0.008 to 0.012 inches thickness was 75 parts by weight of the Type 205 material, 25 parts by weight magnesium zirconate, Type 210 material (24 wt.-% magnesium oxide, 76 wt.-% zirconium oxide) of Sultzer Metco, Westbury, N.Y., and 10 parts by weight tungsten carbide. The magnesium zirconate in the top coat enhances the coefficient of friction for braking purposes. The tungsten carbide, in both instances Type 32-C of Sultzer Metco, Westbury, N.Y., makes heat in the brake pads and keeps them from glazing over. Gas flow rate through the plasma sprayer was about 75 cubic feet per hour, using a G-nozzle. The gas was nitrogen, with addition of hydrogen to increase temperature as required to achieve sufficient powder particle melting. The brake rotor was rotated on a turntable at about 200 rpm, to bring the various locations of the braking surfaces under the spray nozzle. The resulting product was tested in the as-sprayed condition having a surface roughness 60 rms, or 200–250 microinches. Negligible dusting resulted. The product withstood repeated thermal cycling achieved by heating to 1000 to 1200 degrees F., followed by immersion in ice water, interspersed by application of brake pressure and abrasion in a brake testing machine for two hours each day, and took 4 to 6 weeks until the coating was worn down to the bond coat. This is a very severe test of thermal cycling-, abrasion-, and compression-resistance and demonstrates the high quality ceramic-coated brake rotor resulting from this example. Titanium has a relatively low coefficient of thermal expansion, which helps in achieving the excellent resistance of this ceramic-coated example of the invention to thermal cycling.

Examples of racing car brakes, and components relating thereto, which may be utilized in accordance with the embodiments of the present invention, may be found in the following U.S. Pat. No. 5,281,004, which issued to O'Leary on Jan. 25, 1994; and No. 4,772,299, which issued to Bogusz on Sep. 20, 1988.

Examples of motorcycle brakes, and components relating thereto, which may be utilized in accordance with the embodiments of the present invention, may be found in the following U.S. Pat. No. 5,244,257, which issued to Muller and Muller on Sep. 14, 1993; No. 5,249,650, which issued to Tanaka on Oct. 5, 1993; No. 5,273,346, which issued to Tsuchida et al. on Dec. 28, 1993; No. 5,344,220, which issued to Roll et al. on Sep. 6, 1994; and No. 5,372,408, which issued to Tsuchida et al. on Dec. 13, 1994.

Examples of air ducts and other cooling arrangements for use for motorcycle brakes, which may be utilized in accordance with the embodiments of the present invention, may be found in the U.S. Patents relating to motorcycle brakes listed immediately above and also in the following additional U.S. Pat. No. 4,641,731, which issued to Kawaguchi et al. on Feb. 10, 1987; No. 4,742,884, which issued to Ishikawa et al. on May 10, 1988; and No. 4,550,809, which issued to Kawaguchi on Nov. 5, 1985.

Examples of general air ducts and other cooling arrangements for general brake assemblies, which may be utilized in accordance with the embodiments of the present invention, may be found in the following U.S. Pat. No. 5,121,818, which issued to McComic on Jun. 16, 1992; No. 4,620,616, which issued to Martin on Nov. 4, 1986; No. 5,002,160, which issued to Weiler et al. on Mar. 26, 1991; and No. 4,533,184, which issued to Muller et al. on Aug. 6, 1985.

Examples of plasma-spraying techniques, and general examples of ceramics, which may be utilized in accordance with the embodiments of the present invention, may be found in the following U.S. Pat. No. 4,290,510, which issued to Warren on Sep. 22, 1981; No. 5,302,465, which issued to Miller et al. on Apr. 12, 1994; No. 5,238,742, which issued to Freeman et al. on Aug. 24, 1993; No. 5,176,964, which issued to Marousek et al. on Jan. 5, 1993; and No. 4,877,705, which issued to Polidor on Oct. 31, 1989.

Examples of high carbon stress relieved steels, which may be utilized in accordance with the embodiment of the present invention, may be found in the following U.S. Pat. No. 4,430,130, which issued to Sorensen on Feb. 7, 1984; No. 3,900,347, which issued to Lorenzetti et al. on Aug. 19, 1975; and No. 4,533,390, which issued to Sherby et al. on Aug. 6, 1985.

Examples of titanium alloys and compositions, i.e. compositions comprising a substantial or significant portion of titanium, which may be utilized in accordance with the embodiments of the present invention, may be found in the following U.S. Pat. No. 5,201,457, which issued to Kitayama et al. on Apr. 13, 1993; No. 5,219,521, which issued to Adams et al. on Jun. 15, 1993; No. 5,244,517, which issued to Kimura et al. on Sep. 14, 1993; No. 5,342,458, which issued to Adams et al. on Aug. 30, 1994; No. 5,358,686, which issued to Parris et al. on Oct. 25, 1994; and No. 5,362,441, which issued to Ogawa et al. on Nov. 8, 1994.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Information Disclosure Statement filed by Applicant in the above-referenced application Ser. No. 08/441,800, are hereby incorporated by reference as if set forth in their entirety herein. The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A ceramic coated, titanium or titanium alloy brake rotor.

2. A plasma-sprayed brake rotor as claimed in claim 1.

3. A single-plane brake rotor as claimed in claim 1.

4. A vaned brake rotor as claimed in claim 1.

5. A cast, vaned brake rotor as claimed in claim 1.

6. A welded, vaned brake rotor as claimed in claim 1.

7. A brake rotor as claimed in claim 1, coated with a ceramic coating containing metal, the coating grading from all metal in a bond coat to all ceramic in a top coat.

8. A brake rotor as claimed in claim 1, having a nickel bond coat and a zirconium oxide top coat.

9. A brake rotor as claimed in claim 8, the bond coat further containing aluminum.

10. A brake rotor as claimed in claim 9, the top coat, or an intermediate coat, having a lesser amount of nickel and aluminum than the bond coat.

11. A brake rotor as claimed in claim 9, having an intermediate coat containing a lesser amount of nickel and aluminum than the bond coat, the top coat being free of nickel and aluminum.

12. A brake rotor as claimed in claim 9, having an intermediate coat containing a lesser amount of nickel and aluminum than the bond coat and a lesser amount of zirconium oxide than the top coat.

13. A brake rotor as claimed in claim 8, the top coat further containing magnesium zirconate.

14. A brake rotor as claimed in claim 8, the top coat further containing tungsten carbide.

15. A brake rotor as claimed in claim 12, the intermediate and top coats containing tungsten carbide.

16. A vaned or single-plane, titanium or titanium alloy, brake rotor coated with a thermal cycling-, abrasion-, and compression-resistant ceramic coating.

17. A ceramic coated, steel, vaned brake rotor.

18. A brake rotor as claimed in claim 17, the steel comprising an alloy steel.

19. A brake rotor as claimed in claim 18, the steel comprising a 4000-series alloy.

20. A brake rotor as claimed in claim 19, the steel comprising 4140 alloy steel.

* * * * *